March 27, 1962 H. G. JORDAN ETAL 3,027,432

SWITCHING DEVICE

Filed Aug. 18, 1959 2 Sheets-Sheet 1

INVENTORS H. G. JORDAN
L. J. PURGETT
W. E. RESTALL, JR.
P. E. SCHWEIZER

BY John C. Morris
ATTORNEY

INVENTORS H. G. JORDAN
L. J. PURGETT
W. E. RESTALL, JR.
P. E. SCHWEIZER
BY John C. Morris
ATTORNEY United States Patent Office 3,027,432

Patented Mar. 27, 1962

3,027,432

SWITCHING DEVICE

Homer G. Jordan, Lawrence J. Purgett, William E. Restall, Jr., and Paul E. Schweizer, Indianapolis, Ind., assignors to Bell Telephone Laboratories, Incorporated, New York, N.Y., a corporation of New York Filed Aug. 18, 1959, Ser. No. 834,528

12 Claims. (Cl. 179—164)

This invention relates to switching devices and more particularly to switch hook assemblies for telephone sets.

In most telephone sets, the switch hook assembly includes a plurality of cooperating contact springs, a card member to move the contact springs to preassigned positions in the proper sequence, a lever member to operate the card member, and a spring member biasing the lever member. The lever member moves between two positions commonly referred to as on-hook and off-hook, and it is operated from one position to the other in response to a change in position of the telephone handset. When the handset is removed from its resting place on the telephone set, the biasing force of the spring member, in combination with or in opposition to the biasing force of the contact springs, moves the lever member to the off-hook position; and when the handset is returned to its resting place, its weight counteracts the net biasing force of the spring member and the contact springs and moves the lever member to the on-hook position. Thus in order for the switch hook assembly to be operated, the weight of the handset must be sufficient to overcome the largest combined biasing force exerted by the spring member and the contact springs. The handset weight that is required to operate the switch hook assembly is referred to as the operating force.

In past years the design of most telephone sets has allowed the full weight of the handset to be used to actuate the lever member, and this weight, due to the materials from which the handset is formed and the components enclosed by the handset, has been large enough so that the operating force required to operate the switch hook assembly has not been critical. However, with the modern trend toward smaller and lighter products, various telephone designs are being evolved wherein the handset weight available to oppose the biasing force of the spring member and contact springs is greatly reduced.

An object of this invention is to provide a switch hook assembly that can be operated by a relatively low operating force.

A further object of this invention is to provide a switch hook assembly that is compact, simple in construction, easy to assemble, reduced in manufacturing costs, and readily held to fairly close manufacturing tolerances.

These and other objectives of the present invention are realized in an illustrative embodiment thereof wherein the switch hook assembly comprises a stop, a first and second group of relatively fixed contact springs positioned on opposite sides of the stop, and a first and second group of relatively movable contact springs respectively positioned adjacent the first and second group of fixed springs. Contacts are secured to the free ends of all of the springs, and the movable springs are pretensioned so that the contacts thereon tend to engage the contacts on the fixed springs.

A lever member is pivotally mounted to the stop, and a card member is fastened to the lever member. The lever member positions the card member between the first and second group of movable springs, the card member having shoulders for engaging and moving one or the other group of movable springs depending upon the direction that the lever member is pivoted. The lever member is limited by a detent to pivoting between two positions, an off-hook position and an on-hook position. When the lever member is moved to the off-hook position, one shoulder of the card member flexes the first group of movable springs away from its associated fixed springs; and when the lever member is moved to the on-hook position, the other shoulder of the card member flexes the second group of movable springs away from its associated fixed springs, the flexed contact springs exerting a biasing force upon the lever member.

Also biasing the lever member is a coil spring member, one end of which is attached to the lever member and the other end of which is anchored. As the lever member moves from one position to the other, the longitudinal axis of the coil spring member changes its position with respect to the pivot point of the lever member, thus varying the biasing force that the coil spring member exerts upon the lever member. By positioning the coil spring member so that the combined biasing force that it and the flexed contact springs exert upon the lever member is maintained at an approximately constant level, which level is held to a minimum, the switch hook assembly is operable by a low operating force.

Thus a feature of this invention resides in positioning a plurality of juxtaposed contact springs having cooperating contacting areas, a means for flexing the contact springs so as to effect the making and breaking of the cooperating contacting areas, and a spring member for biasing the means so that the combined biasing force exerted upon the means by the flexed contact springs and the spring member is generally maintained at a predetermined and constant level.

A complete understanding of the invention and of this and other features and advantages thereof may be gained from consideration of the following detailed description taken in conjunction with the accompanying drawing wherein one embodiment of the invention is illustrated. It is to be expressly understood however that the drawing is for the purposes of illustration and description and is not to be construed as defining the limits of the invention.

Figure 4A:
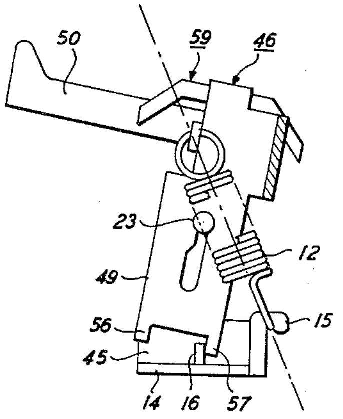
Figure 5A:
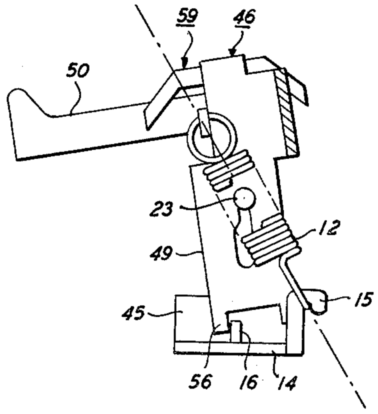
Figure 4B:
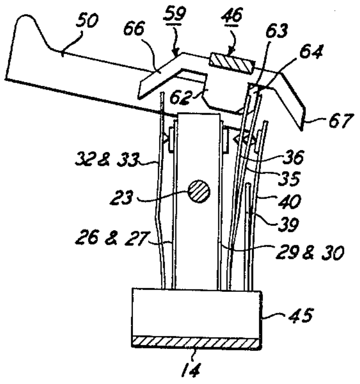
Figure 5B:
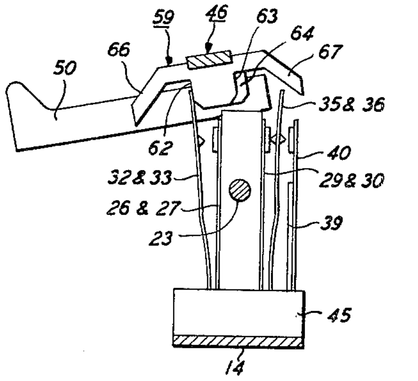

FIGS. 4A and 4B are sectional views taken at two different points to show the interaction between the elements of the switch hook assembly when the lever member is in the off-hook position; and, FIGS. 5A and 5B are sectional views respectively taken at the same points as 4A and 4B to show the interaction between the elements of the switch hook assembly when the lever member is in the on-hook position.

Figure 1:
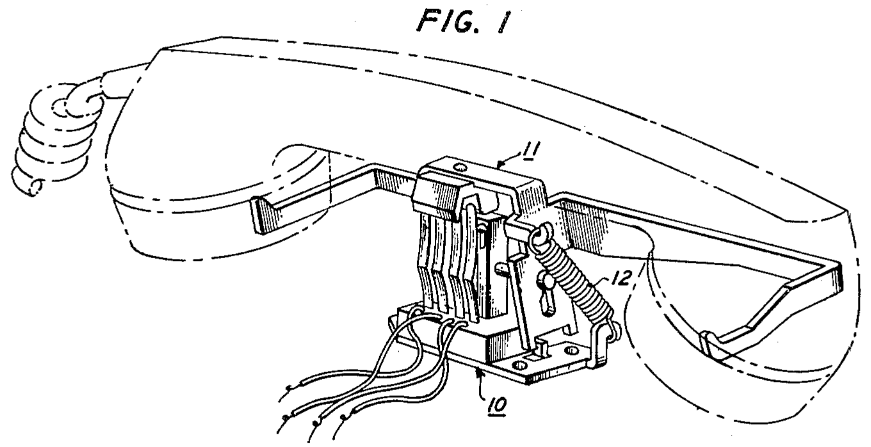
FIG. 1 is a perspective view of the switch hook assembly of this invention showing a handset in phantom thereon operating the lever member to the on-hook position.
Figure 2:
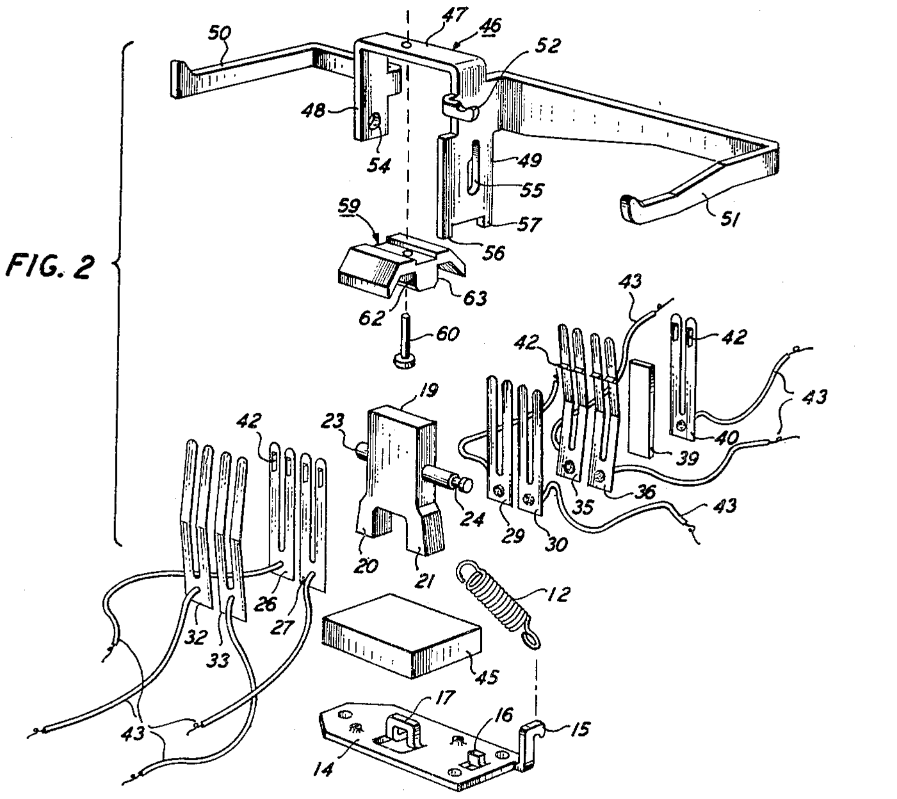
FIG. 2 is an exploded perspective view showing the elements of the switch hook assembly.

Referring to FIGS. 1 and 2, the switch hook assembly of this invention consists of a contact spring subassembly 10, a lever arm subassembly 11, and a spring member 12. The contact spring subassembly comprises a base plate 14 having an upturned hook portion 15, detent portion 16, and anchor portion 17. A stop member 19 having legs 20 and 21 is positioned above the base plate, and a pivot pin 23 having an annular groove 24 formed adjacent one end thereof is mounted in the stop member.

Contact springs 26 and 27 and contact springs 29 and 30 are respectively positioned on opposite sides of the stop member 19. The contact springs are pre-tensioned against the stop member and are thereby held in a relatively fixed position. Relatively movable contact springs 32 and 33 are respectively positioned a spaced distance from the fixed contact springs 26 and 27, and relatively movable contact springs 35 and 36 are respectively positioned a spaced distance from the fixed contact springs 29 and 30. A spacer member 39 is positioned a spaced distance from the movable contact spring 35, and a contact spring 40, positioned adjacent the spacer member and pre-tensioned thereagainst, is held by the spacer member in a relatively fixed position a spaced distance from the movable contact spring 35.

The upper ends of all of the contact springs are bifurcated, and a contact 42 is placed on each of the bifurcated portions. The contacts are cross-bar contacts; thus, on one of the contact springs the contacts are positioned parallel to the longitudinal axis of the spring, and on the opposing contact spring the contacts are positioned perpendicular to the longitudinal axis of the spring. The lower end of each contact spring has a wire lead 43 secured thereto by any well-known means such as spot welding.

The base plate 14, the stop member 19, the contact springs 26, 27, 29, 30, 32, 33, 35, 36, and 40, and the spacer member 39 may be advantageously secured together by imbedding them within a unitary dielectric base block 45. The members are placed in a fixture, which properly locates them with respect to each other, and the base block is molded about them, the block being formed from a plastic material such as styrene. The upturned anchor portion 17 of the base plate, the legs 20 and 21 of the stop member, and the irregular surface of the connection between the wire leads 43 and the contact springs all serve to moor the components within the block. The assembly of the components by means of the unitary block minimizes an adverse accumulation of manufacturing tolerances and hence allows the tolerances to be held to closer limits than otherwise would be possible. In addition, this type of assembly minimizes the number of parts used since conventional fastening devices and the associated insulating parts are eliminated.

The lever arm subassembly 11 comprises a lever member 46 having a yoke portion 47, legs 48 and 49, arms 50 and 51, and a hook portion 52. The leg 48 is provided with an aperture 54, and the leg 49 is provided with a slot 55 and detent fingers 56 and 57.

Figure 3:
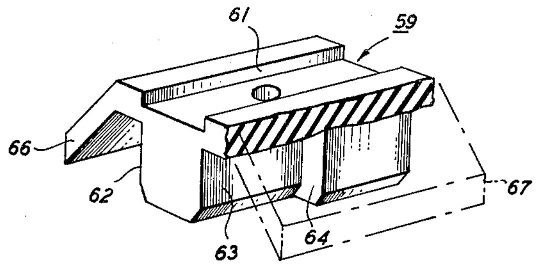
FIG. 3 is a perspective view, partly in section of the card member.

A card member 59 is fastened to the underside of the yoke 47 of the lever member 46 by any well-known means such as a rivet 60. As shown most clearly in FIG. 3, the card member has a notch 61 formed in the upper surface thereof for properly locating it with respect to the lever member. The card is provided with shoulder portions 62 and 63 which may be stepped as at 64 to sequentially operate the contact springs as hereinafter described. The card is further provided with arm portions 66 and 67 for mechanical protection of and dust exclusion from the contacting areas.

Referring again to FIGS. 1 and 2, the contact spring subassembly 10 and the lever arm subassembly 11 are assembled in the following manner: The right end of the pivot pin 23 is inserted through the slot 55 in the leg 49 of the lever member 46, the shoulder portions 62 and 63 of the card member 59 are placed between the movable contact springs 32 and 33 and the movable contact springs 35 and 36, and the left end of the pivot pin is inserted through the aperture 54 in the leg 48 of the lever member. The lever member is positioned so that the upper edge of the slot 55 registers in the annular groove 24 of the pivot pin and the detent portion 16 of the base plate 14 extends between the detent fingers 56 and 57 of the leg 49. The two subassemblies are held together by placing one end of the spring member 12 on the hook portion 15 of the base plate and placing the other end of the spring member on the hook portion 52 of the lever member.

Turning now to FIG. 4A, the spring member 12 biases the lever member 46 in a clockwise direction so that when the handset is removed from its resting place on the telephone set, the lever member pivots until the detent portion 16 on the base plate 14 engages the detent finger 57 on the leg 49 of the lever member, placing the switch hook assembly in an off-hook position. As shown in FIG. 4B, in this position the movable contact springs 32 and 33 engage the fixed contact springs 26 and 27, while the shoulder 63 of the card member 59 disengages the movable contact springs 35 and 36 from the fixed contact springs 29 and 30, and the step 64 in the shoulder portion 63 moves the movable contact spring 35 into engagement with the fixed contact spring 40.

When the handset is returned to its resting place on the telephone set, the weight of the handset acts upon the arms 50 and 51 of the lever member 46 to pivot the lever member in a counterclockwise direction toward an on-hook position. Initially the weight of the handset is opposed by the biasing force exerted on the lever member by the spring member 12 and aided by the biasing force exerted by the flexed movable contact springs 35 and 36 and somewhat flexed fixed contact spring 40. Because it is desirable that a certain minimum amount of force be required to move the lever member from an off-hook position so that an accidental jarring of the telephone set does not operate the switch hook assembly, the spring member is positioned so that the biasing force exerted thereby surpasses the biasing force exerted by the flexed contact springs by this minimum amount of force. Thus the weight of the handset must provide this amount of force in order to move the assembly from the off-hook position. In one specific embodiment the minimum was set at approximately 60 grams of force.

As the lever member 46 pivots in a counterclockwise direction, the step 64 in the shoulder 63 of the card member 59 sequentially permits the movable contact spring 36 to engage the fixed contact spring 30 and the movable contact spring 35 to transfer its engagement from the fixed contact spring 40 to the fixed contact spring 29. The biasing force exerted upon the lever by these contact springs therefore diminishes to zero. However, at the same time, the longitudinal axis of the spring member 12 moves toward a dead center position with respect to the pivot pin 23. Thus the biasing force exerted upon the lever member by the spring member also diminishes, and the force which the handset must exert to continue the rotation of the lever member remains approximately the same.

As shown in FIGS. 5A and 5B, further pivoting of the lever member 46 toward the on-hook position causes the shoulder portion 62 of the card member 59 to contact the movable contact springs 32 and 33 and respectively disengage them from the fixed contact springs 26 and 27. The movable springs 32 and 33 exert a biasing force upon the lever member that aids the spring member 12 in opposing the weight of the handset, but the longitudinal axis of the spring member is close to the dead center position so that it exerts very little biasing force and the net force required to pivot the lever member remains approximately constant.

When the switch hook assembly is in an on-hook position, the detent portion 16 on the base plate 14 having engaged the detent finger 56 on the leg 49, this same balance is still maintained. The biasing force exerted by the flexed movable contact springs 32 and 33 in opposition to the handset is increased, but the longitudinal axis of the spring member 12 is at dead center or slightly to the other side of dead center so that it either exerts no biasing force at all or aids the weight of the handset to some small degree.

By maintaining an approximate balance between the biasing force exerted by the spring member and the contact springs, the force necessary to operate the switch hook assembly is held to the desirable minimum amount of force required to move the assembly from the off-hook position, thereby allowing the switch hook assembly to be operated by a relatively low operating force.

When the switch hook assembly moves from an on-hook position to an off-hook position, the reverse sequence of steps takes place. It will be noticed that in all positions of the switch hook assembly the arm portions 66 and 67 of the card member 59 provide a cover for the contacting areas of all the contact springs.

The term handset as used in the specification and claims includes any device used to operate a switch hook assembly of the type herein disclosed.

Although but one embodiment of the invention has been illustrated and described in detail, it is to be expressly understood that the invention is not limited thereto. Various changes can be made in the design and arrangement of the parts without departing from the spirit and the scope of the invention as the same will now be understood by those skilled in the art.

What is claimed is:

1. In a telephone subset including a handset, a switch hook assembly comprising a stop member, a first and second group of contact springs respectively positioned on opposite sides and held in a relatively fixed position by said stop member, said fixed contact springs carrying contacts adjacent to the free ends thereof, a first and second group of relatively movable contact springs respectively positioned adjacent to said first and said second group of fixed contact springs, said movable contact springs carrying contacts adjacent to the free ends thereof, a plurality of lead wires secured to the other ends of all said springs, said stop, a portion of said lead wires and the other ends of all said contact springs being secured in a unitary dielectric base, a pivot pin affixed to said stop member, a lever member pivotally mounted on said pivot pin, said lever member being movable between two positions, said lever member having a card member for engaging one group of movable contact springs in one position and the other group of movable contact springs in the other position, said card member having shoulders for flexing said movable contact springs so that contacts thereon sequentially engage or disengage the contacts on said fixed contact springs, said flexed contact springs exerting a biasing force upon said card member, said card member further having arms for providing a cover for the contacts on all said contact springs, a spring member for biasing said lever member toward one of said positions, the weight of said handset providing the force to move said lever member to the other of said positions, the spring member being positioned so that the combined biasing force exerted on said lever member by said spring member and by said flexed movable contact springs is such that said handset need only exert a relatively low force to move said lever member to the other of said positions.

2. In a telephone subset including a handset, a switch hook assembly comprising a stop member, a first and second group of contact springs respectively positioned on opposite sides and held in a relatively fixed position by said stop member, said fixed contact springs carrying contacts adjacent to the free ends thereof, a first and second group of relatively movable contact springs respectively positioned adjacent to said first and said second group of fixed contact springs, said movable contact springs carrying contacts adjacent to the free ends thereof, a plurality of lead wires secured to the other ends of all said springs, a portion of said lead wires and the other ends of all said contact springs being secured in a unitary dielectric base, a lever member pivotally mounted to said stop member, said lever member being movable between two positions, said lever member having a card member for engaging one group of movable contact springs in one position and the other group of movable contact springs in the other position, said card member having shoulders for flexing said movable contact springs so that contacts thereon sequentially engage or disengage the contacts on said fixed contact springs, said flexed contact springs exerting a biasing force upon said card member, a spring member for biasing said lever member toward one of said positions, the weight of said handset providing the force to move said lever member to the other of said positions, said spring member being positioned so that the combined biasing force exerted on said lever member by said spring member and by said flexed movable contact springs is such that said handset need only exert a relatively low force to move said lever member to the other of said positions.

3. In telephone subset including a handset, a switch hook assembly comprising a stop member, a first and second group of contact springs respectively positioned on opposite sides of and held in a relatively fixed position by said stop member, said fixed contact springs carrying contacts adjacent to the free ends thereof, a first and second group of relatively movable contact springs respectively positioned adjacent to said first and said second group of fixed contact springs, said movable contact springs carrying contacts adjacent to the free ends thereof, said stop member and the other ends of all said contact springs being secured in a unitary dielectric support, a card member for actuating said movable contact springs, said card member being positioned between said first and said second group of movable contact springs and having shoulders for flexing said movable contact springs so that the contacts thereon sequentially engage or disengage the contacts on said fixed contact springs, said movable contact springs exerting a biasing force upon said card member when in a flexed condition, said card member being movable between two positions, said card member engaging and flexing said first group of movable contact springs in one of said positions and said second group of movable contact springs in the other of said positions, a spring member for biasing said card member toward one of said positions, the weight of said handset providing the force to move said card member to the other of said positions, said spring member being positioned so that the combined biasing force exerted on said card member by said spring member and by said flexed movable contact springs is such that said handset need only exert a relatively low force to move said card member to the other of said positions.

4. In a telephone subset including a handset, a switch hook assembly comprising a stop member, a first and second group of relatively fixed contact springs respectively positioned on opposite sides of said stop member, said fixed contact springs having contacting areas, a first and second group of relatively movable contact springs respectively positioned adjacent to said first and second group of fixed contact springs, said movable contact springs having contacting areas cooperating with the contacting areas on the associated fixed contact springs, a card member for engaging and flexing said movable contact springs so as to effect the engagement or disengagement of the cooperating contacting areas, said movable contact springs exerting a biasing force upon said card member when in a flexed condition, said card member being movable between two positions, said card member engaging and flexing said first group of movable contact springs in one of said positions and said second group of movable contact springs in the other of said positions, a spring member for biasing said card member toward one of said positions, the weight of said handset providing the force to move said card member to the other of said positions, said spring member being positioned so that the combined biasing force exerted on said card member by said spring member and by said flexed movable contact springs is such that said handset need only exert a relatively low force to move said card member to the other of said positions.

5. A switch hook assembly comprising a stop member, a first and second group of contact springs positioned on opposite sides of and maintained in a relatively fixed position by said stop member, said fixed contact springs having contacting areas, a first and second group of relatively movable contact springs respectively positioned adjacent to said first and said second group of fixed contact springs, said movable contact springs having contacting areas cooperating with the contacting areas on the associated fixed contact springs, a lever member pivotally mounted to said stop, said lever member being movable between two positions, said lever member having a card member positioned between said first and said second group of movable springs for actuating one group of movable springs in one position and the other group of movable springs in the other position, said card member having shoulders for flexing said movable contact springs so as to effect the making or breaking of said cooperating contacting areas, a spring member for biasing said lever member toward one of said positions, said spring member being positioned so that the combined biasing force exerted upon said lever member by said movable contact springs and said spring member remains approximately constant as said lever member moves from one position to the other.

6. A switch hook assembly comprising a stop member, a first and second group of contact springs positioned on opposite sides of and maintained in a relatively fixed position by said stop member, said fixed contact springs having contacting areas, a first and second group of relatively movable contact springs respectively positioned adjacent to said first and said second group of fixed contact springs, said movable contact springs having contacting areas cooperating with the contacting areas on the associated fixed contact springs, a lever member pivotally mounted to said stop, said lever member being movable between two positions, said lever member having a card member for actuating one group of movable springs in one position and the other group of movable springs in the other position, said card member having shoulders for flexing said movable contact springs so as to effect the making or breaking of said cooperating contacting areas, a spring member for biasing said lever member toward one of said positions, said spring member being positioned so that the combined biasing force exerted upon said lever member by said flexed movable contact springs and said spring member remains approximately constant as said lever member moves from one position to the other.

7. A switchhook assembly comprising a stop member, a first and second group of contact springs positioned on opposite sides and maintained in a relatively fixed position by said stop member, the fixed contact springs having contacting areas, a first and second group of relatively movable contact springs respectively positioned adjacent to said first and said second group of fixed contact springs, said movable contact springs having contacting areas cooperating with the contacting areas on the associated fixed contact springs, a card member for operating said movable springs, said card member being movable between two positions and operating said first group of movable springs in one position and said second group of movable springs in the other positon, said card member having shoulders for flexing said movable springs so as to effect the making or breaking of said cooperating contacting areas, and a spring member acting in concert with said first group of movable springs for biasing said card member toward one of said positions, the net biasing force exerted upon said card member by said flexed movable springs and said spring member being approximately constant as said card member moves from one position to the other.

8. A switchhook assembly comprising a stop member, a first and second group of contact springs positioned on opposite sides and maintained in a relatively fixed position by said stop member, the fixed contact springs having contacting areas a first and second group of relatively movable contact springs respectively positioned adjacent to said first and said second group of fixed contact springs, said movable contact springs having contacting areas cooperating with the contacting areas on the associated fixed contact springs, a card member for actuating said movable springs, said card member being movable between two positions and actuating said first group of movable springs in one position and said second group of movable springs in the other position so as to effect the making or breaking of said cooperating contacting areas, and a spring member acting in concert with said first group of movable springs for biasing said card member toward one of said positions, the net biasing force exerted upon said card member by said actuated movable springs and said spring member being approximately constant as said card member moves from one position to the other.

9. A switchhook assembly comprising a first and second group of relatively fixed contact springs having contacting areas, a first and second group of relatively movable contact springs respectively positioned adjacent to said first and said second group of fixed contact springs, said movable contact springs having contacting areas cooperating with the contacting areas on the associated fixed contact springs, a card member for actuating said movable springs, said card member being movable between two positions and actuating said first group of movable springs in one position and said second group of movable springs in the other position so as to effect the making or breaking of said cooperating contacting areas, and a spring member acting in concert with said first group of movable springs for biasing said card member toward one of said positions, the net biasing force exerted upon said card member by said actuated movable springs and said spring member being approximately constant as said card member moves from one position to the other.

10. A switchhook assembly comprising a first and second group of relatively fixed contact springs having contacting areas, a first and second group of relatively movable contact springs respectively positioned adjacent to said first and said second group of fixed contact springs, said movable contact springs having contacting areas cooperating with the contacting areas on the associated fixed contact springs, means for actuating said movable springs, said actuating means being movable between two positions and actuating said first group of movable springs in one position and said second group of movable springs in the other position, and a spring member acting in concert with said first group of movable springs for biasing said actuating means toward one of said positions, the net biasing force exerted upon said actuating means by said actuated movable springs and said spring member being approximately constant as said actuating means moves from one position to the other.

11. A switching device comprising a first and a second group of juxtaposed contact springs, means movable between two positions for actuating said first group of contact springs in one position and said second group of contact springs in the other position, and a spring member acting in concert with said first group of contact springs for biasing said actuating means toward one of said positions, the net biasing force exerted upon said actuating means by said actuated contact springs and said spring member being approximately constant as said actuating means moves from one position to the other.

12. A switching device comprising a first and a second group of juxtaposed contact springs, means movable between two positions for actuating said first group of contact springs in one position and said second group of contact springs in the other position, and a spring member for biasing said actuating means toward one of said positions, the net biasing force exerted upon said actuating means by said actuated contact springs and said spring member being approximately constant as said actuating means moves from one position to the other.

References Cited in the file of this patent

UNITED STATES PATENTS

| | | |
|---|---|---|
| 2,443,799 | Nilsson | June 22, 1948 |
| 2,566,840 | Krumreich | Sept. 4, 1951 |